(12) United States Patent
Sumi et al.

(10) Patent No.: US 7,487,687 B2
(45) Date of Patent: Feb. 10, 2009

(54) OCCUPANT LOAD SENSOR OF SEAT FOR VEHICLE

(75) Inventors: Chiaki Sumi, Chita-gun (JP); Satohiko Nakano, Chiryu (JP); Mutsuro Aoyama, Nagoya (JP); Kazunori Sakamoto, Chiryu (JP); Hideki Kawabata, Chita-gun (JP); Muneto Inayoshi, Nagoya (JP); Hajime Shiohara, Obu (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/976,716

(22) Filed: Oct. 26, 2007

(65) Prior Publication Data

US 2008/0098823 A1     May 1, 2008

(30) Foreign Application Priority Data

Oct. 31, 2006 (JP) .............................. 2006-296883
Sep. 28, 2007 (JP) .............................. 2007-254462

(51) Int. Cl.
   *G01L 1/26* (2006.01)
(52) U.S. Cl. .............................. 73/862.391; 73/862.474
(58) Field of Classification Search ............ 73/862.391, 73/862.474
   See application file for complete search history.

(56) References Cited

U.S. PATENT DOCUMENTS

| | | | |
|---|---|---|---|
| 6,242,701 B1 | 6/2001 | Breed et al. | |
| 7,155,981 B2 | 1/2007 | Matsuura et al. | |
| 7,189,931 B2 | 3/2007 | Hida et al. | |
| 2006/0144630 A1* | 7/2006 | Breed et al. .................. | 180/273 |
| 2006/0185446 A1* | 8/2006 | Speckhart .............. | 73/862.391 |
| 2008/0036185 A1* | 2/2008 | Breed ......................... | 280/734 |
| 2008/0127752 A1* | 6/2008 | Nakano et al. ......... | 73/862.627 |
| 2008/0156103 A1* | 7/2008 | Nakano et al. ................ | 73/781 |

FOREIGN PATENT DOCUMENTS

| | | |
|---|---|---|
| JP | 2004-069535 A | 3/2004 |
| WO | WO 2005/080931 A1 | 9/2005 |
| WO | WO 2006/011597 A | 2/2006 |

* cited by examiner

*Primary Examiner*—Max Noori
(74) *Attorney, Agent, or Firm*—Buchanan Ingersoll & Rooney PC (57) ABSTRACT

An occupant load sensor of a seat for a vehicle includes a metal-made bracket fixed to a strain member and having an attachment portion extending in a lateral direction from the strain member, an amplifier substrate for amplifying a signal transmitted by the strain gauge. One surface of the amplifier substrate is covered by the attachment portion of the metal-made bracket and the other surface thereof is covered by a metal-foil ground pattern. The occupant load sensor further includes a resin-made amplifier case fixed to the attachment portion of the metal-made bracket and arranged in parallel to the strain member. The resin-made amplifier case houses therein the amplifier substrate.

2 Claims, 6 Drawing Sheets

OCCUPANT LOAD SENSOR OF SEAT FOR VEHICLE

CROSS REFERENCE TO RELATED APPLICATIONS

This application is based on and claims priority under 35 U.S.C. §119 with respect to Japanese Patent Application 2006-296883, filed on Oct. 31, 2006, and Japanese Patent Application 2007-254462, filed on Sep. 29, 2007, the entire content of which is incorporated herein by reference.

FIELD OF THE INVENTION

The present invention relates to an occupant load sensor for measuring a weight of an occupant seated on a seat for a vehicle.

BACKGROUND

Recent requirements have led to controlling of operations of safety devices in accordance with a weight of an occupant seated on a seat for a vehicle, for the purpose of enhancing performances of safety devices, such as a seat belt, an air bag, and so on.

WO2006/011597 discloses therein an occupant weight measurement device. The occupant weight measurement device includes: a left and right pair of fixed lower rails fixed to a vehicle; a pair of movable upper rails provided so as to be movable in backward and forward directions on the respective fixed lower rails; a load sensor mounted on each movable upper rail and having a rod extending vertically upwardly; and a rectangular frame mounted above the pair of movable upper rails and formed with installation holes. The rods of the load sensors are vertically upwardly inserted into the installation holes of the rectangular frame, respectively and, thus the rectangular frame is mounted on the load sensors.

As described above, because the rectangular frame, which is shaped in advance, is mounted on the load sensors with the rods of the load sensors vertically upwardly inserted into the installation holes of the rectangular frame, occurrences of initial strain and initial load are restrained. As a result, it is possible to measure a weight of an occupant more precisely than an occupant weight measurement device, by which components for the rectangular frame are mounted on the load sensors and then assembled to the rectangular frame.

In the aforementioned occupant weight measurement device, load, which corresponds to a weight of an occupant, is converted into an electrical signal by a strain gauge at a sensing-portion of the load sensor. The electrical signal however, is influenced by even slight variations in electrical resistance. Therefore, in general, an amplifier having an electronic circuit is arranged in parallel, so that the variations in electrical resistance are amplified to be read. Meanwhile, various electromagnetic waves are induced by various in-vehicle equipments, such as drivers, lighting equipment, and so on, and influence on complex electronic circuits, so that an erroneous measurement and improper operations may occur. In light of the foregoing, in general the amplifier is housed in an amplifier case made of metal such as aluminum, and the amplifier and the amplifier case are both connected to earth, thereby shielding electromagnetic waves (noise). However, the aluminum-made amplifier case costs highly so that recent requirements have led to a resin-made amplifier case. Although the resin-made amplifier case is appropriate to reduce weight and to save a mounting space, it may not excel at reducing noise possibly contained in an electrical signal.

A need exists for an occupant load sensor for a seat of a vehicle, which is not susceptible to the drawback mentioned above.

SUMMARY OF THE INVENTION

According to an aspect of the present invention, an occupant load sensor of a seat for a vehicle includes a strain member adapted to be fixed at both ends of a fixing surface provided at one of a floor-side stationary member and a seat-side stationary member with a predetermined distance from the fixing surface in a vertical direction of the seat, a connecting member vertically fixed to the strain member and adapted to be fixed to the other one of the floor-side stationary member and the seat-side stationary member, a strain gauge attached to the strain member, a metal-made bracket fixed to the strain member and having an attachment portion extending in a lateral direction of the seat from the strain member, an amplifier substrate for amplifying a signal transmitted by the strain gauge, and a resin-made amplifier case fixed to the attachment portion of the metal-made bracket and arranged in parallel to the strain member. One surface of the amplifier substrate being covered by the attachment portion of the metal-made bracket and the other surface thereof being covered by a metal-foil ground pattern. The resin-made amplifier case housing the amplifier substrate.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

FIGS. 1 to 8 illustrate embodiments of the present invention. A horizontal direction corresponds to forward and backward directions of a vehicle or a seat, and a lateral direction corresponds to left and right directions of the vehicle or the seat. Also, a vertical direction corresponds to a vertical direction of the vehicle or the seat.

Figure 1:
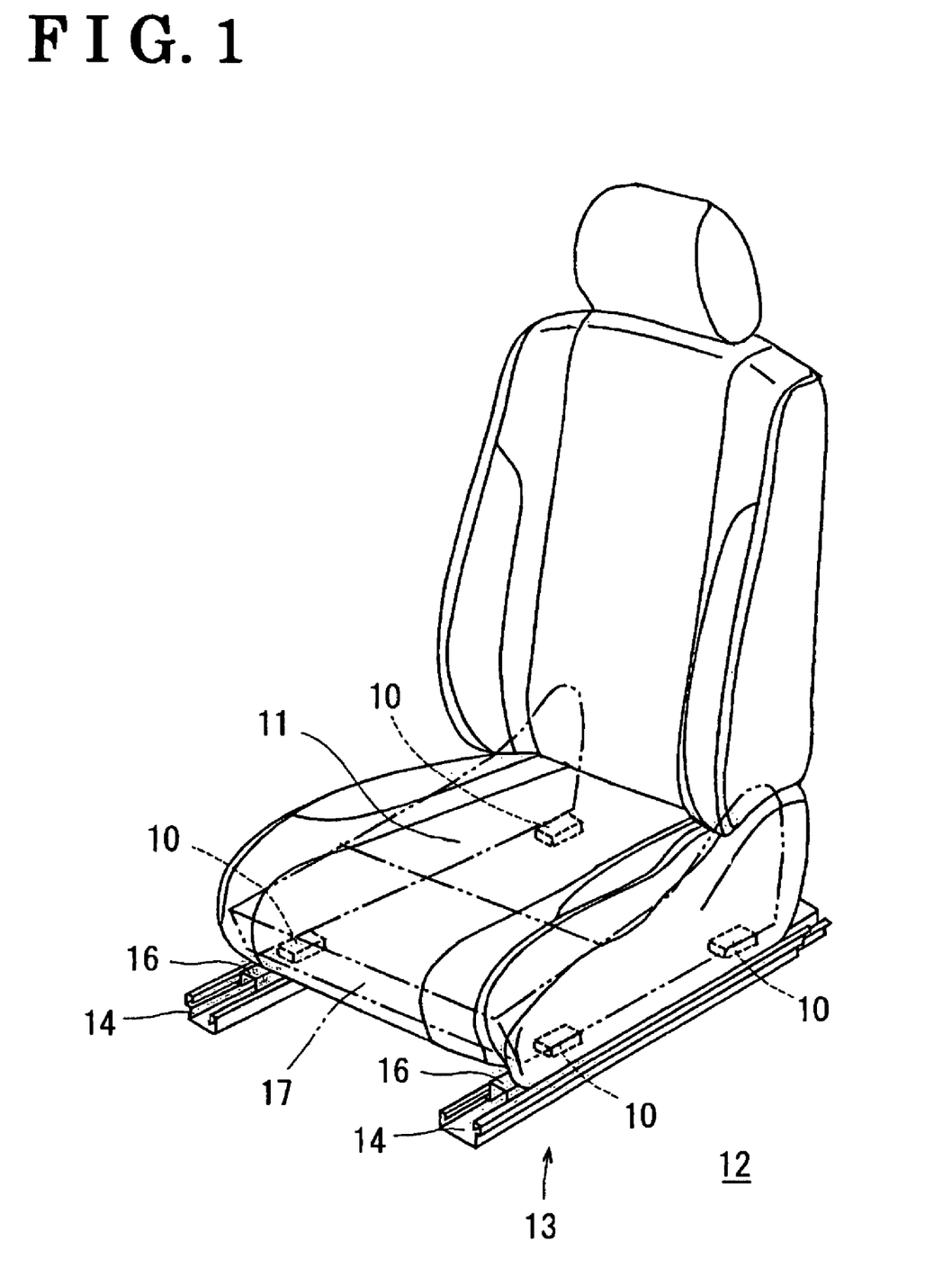
FIG. 1 is a perspective view illustrating a seat applied with an occupant load sensor of a seat for a vehicle according to an embodiment.

Described below are occupant load sensors 10 of a seat for a vehicle according to an embodiment of the present invention, with reference to the attached drawings. The occupant load sensor 10 is configured to detect a load of an occupant seated on a seat 11 for a vehicle illustrated in FIG. 1. A seat sliding apparatus 13 illustrated in FIG. 1 is configured to adjustably secure the seat 11 to a vehicle floor 12 in a manner that the seat 11 is positioned in a longitudinal direction of the vehicle. The seat sliding apparatus 13 includes: a pair of lower rails 14 fixedly mounted on a floor 12 and extending in the longitudinal direction; a pair of upper rails 16 slidably supported by the lower rails 14.

Figure 2:
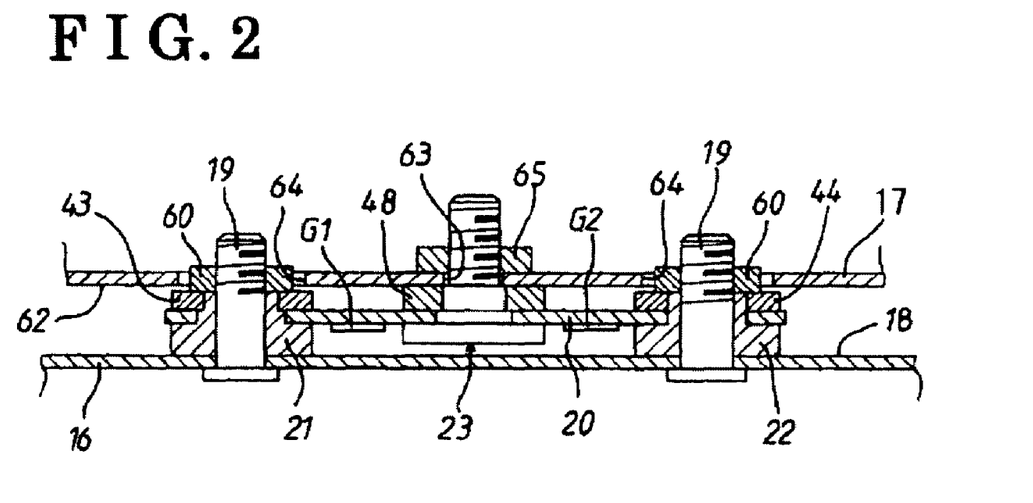
FIG. 2 is a sectional view illustrating an assembled state of the load sensor to a frame of the seat.

As illustrated in FIGS. 1 and 2, a lower portion of the seat 11 is structured with a frame 17 (seat-side stationary member) attached to a lower surface of a seat cushion. Among the four corners of the lower surface of the frame 17, two of the corners arranged in series are fixed to fixing surfaces 18 formed at an upper surface of one of the upper rails 16, via the occupant load sensors 10. Other two of the corners arranged in series are fixed to fixing surfaces 18 formed at an upper surface of the other one of the upper rails 16, via the occupant load sensors 10. A pair of fixed shafts 19 is arranged at an end of each upper rail 16 with a predetermined distance therebetween in the longitudinal direction, an end where the occupant load sensor 10 is located. The fixed shafts 19 protrude vertically upwardly at each end of each upper rail 16, so that the corresponding occupant load sensor 10 is fixedly mounted on the fixing surface 18.

Figure 3:
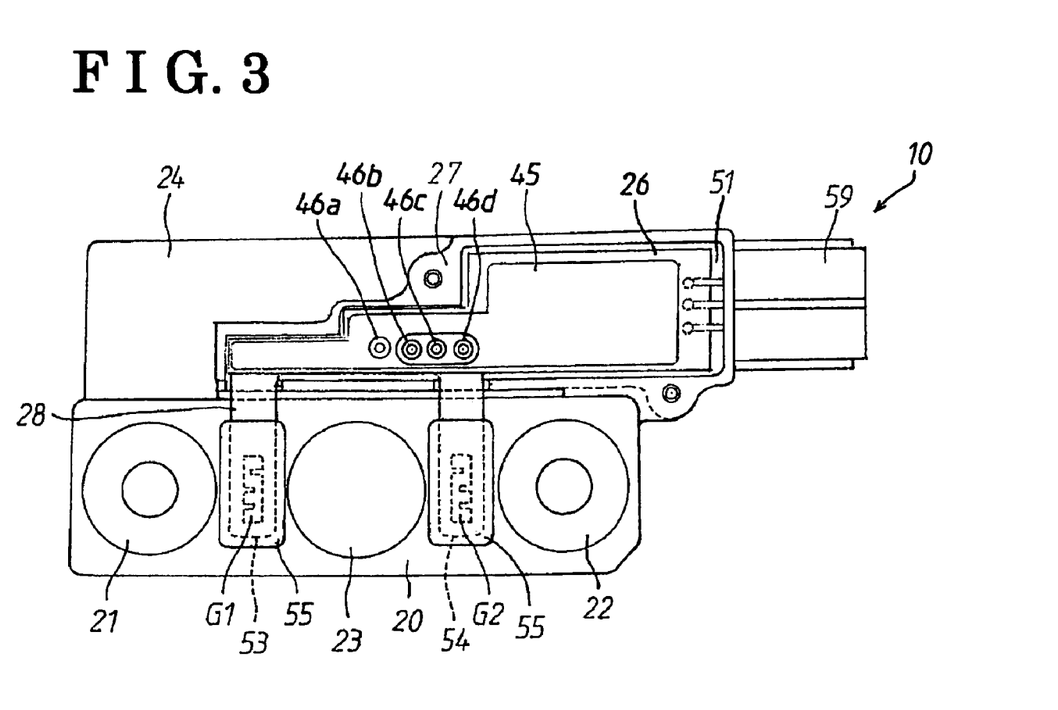
FIG. 3 is a backside view illustrating the load sensor.
Figure 4:
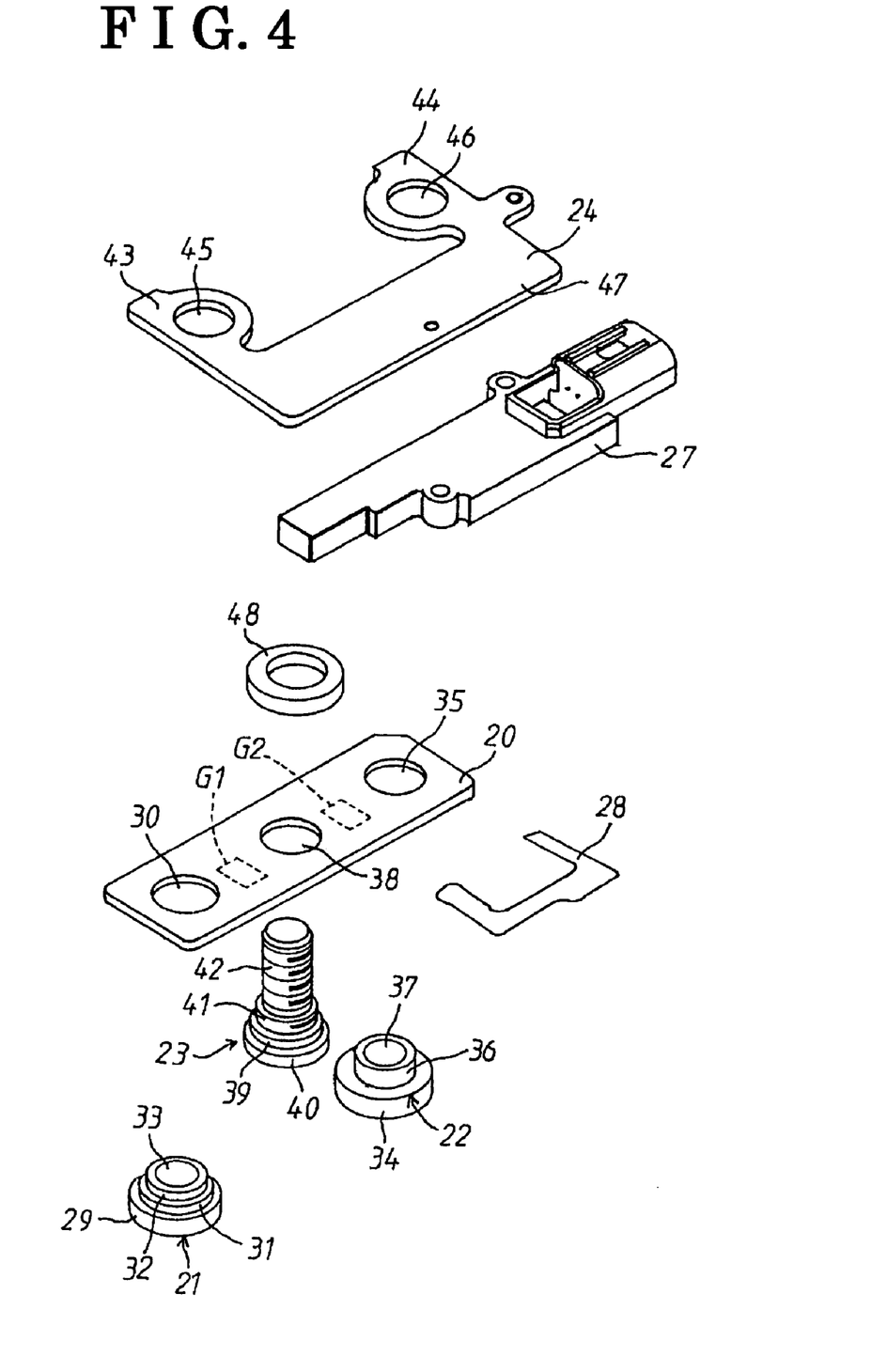
FIG. 4 is an exploded perspective view illustrating the load sensor.
Figure 6:
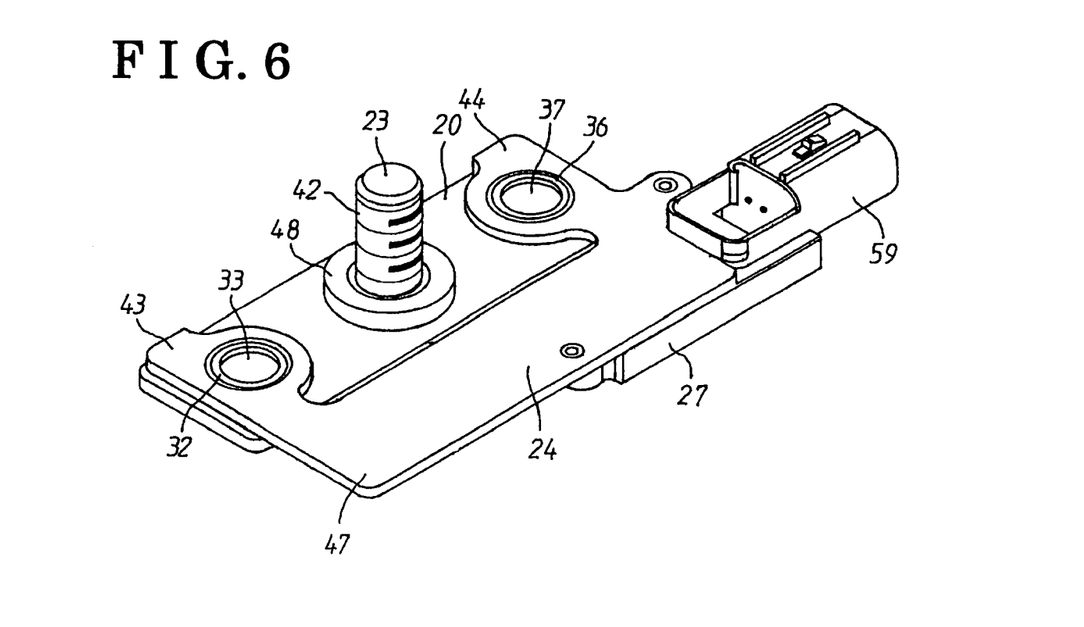
FIG. 6 is a perspective view illustrating the occupant load sensor already assembled.

As is illustrated in FIGS. 4 and 6, each occupant load sensor 10 includes: a strain member 20; strain gauges G1, G2 attached to a surface (lower surface) of the strain member 20; first and second lower brackets 21, 22 securing the strain member 20 at its both ends to the corresponding fixing surface 18 of the lower rail 14; and a connecting shaft 23 vertically fixed to an intermediate of the strain member 20 and protruding vertically from the strain member 20. The connecting shaft 23 is firmly attached to the frame 17 of the seat 11. Each occupant load sensor 10 further includes: an upper bracket 24 serving as a bracket firmly mounted on the upper surface of the strain member 20 at its both ends; an amplifier case 27 attached to an attachment portion 47 of the upper bracket 24 along with the strain member 20 and housing an amplifier substrate 26 (see FIG. 3) for amplifying signals transmitted from the strain gauges G1, G2; and an FPC (Flexible Printed Circuits) substrate 28 connected to the strain gauges G1, G2 and to the amplifier substrate 26.

As is obvious from FIG. 4, the first lower bracket 21 is structured with: a base portion 29 having a predetermined thickness in the vertical direction; an intermediate shaft portion 31 protruding from the base portion 29 upwardly and pressed into a hole 30 defined at one end of the strain member 20; an upper shaft portion 32 protruding from the intermediate shaft portion 31 upwardly; and an attachment hole 33 defined at the center of the first lower bracket 21 and penetrating therethrough. The second lower bracket 22 is structured with: a base portion 34 having a predetermined thickness in the vertical direction; a shaft portion 36 protruding from the base portion 34 upwardly and idly inserted into a hole 35 defined at the other end of the strain member 20; and an attachment hole 37 defined at the center of the second lower bracket 22 and penetrating therethrough.

Figure 5:
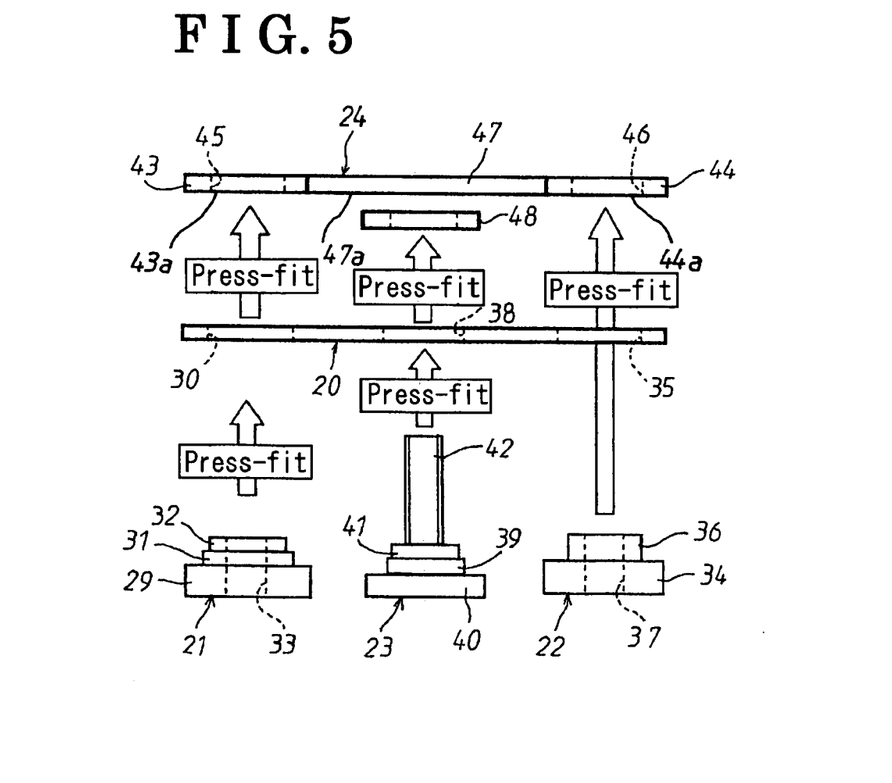
FIG. 5 is a view for explaining assembling brackets and a connecting shaft to a strain member.

The hole 30 and the hole 35 are formed at both ends of each strain member 20 with the same distance as the distance of each pair of fixed shafts 19. As illustrated in FIG. 5, in cases where the first and second lower brackets 21, 22 are fitted into the strain member 20, the base portion 29 of the first lower bracket 21 and the base portion 34 of the second lower bracket 22 come in contact with the lower surface of the strain member 20. In this case, the intermediate shaft portion 31 of the first lower bracket 21 is press-fitted into the hole 30 of the strain member 20, while the shaft portion 36 of the second lower bracket 22 is idly inserted into the hole 35 of the strain member 20. The strain member 20 is further formed with an intermediate hole 38, into which an intermediate shaft 39 of the connecting shaft 23 is press-fitted. The connecting shaft 23 includes, at its end, a flange 40 having a smaller thickness than the thicknesses of the base portions 29, 34 of the first and second lower brackets 21, 22. The flange 40 of the connecting shaft 23 comes in contact with the lower surface of the strain member 20 when the connecting shaft 23 is press-fitted into the intermediate hole 38 of the strain member 20. The connecting shaft 23 further includes an upper shaft portion 41 protruding from the upper surface of the intermediate shaft 39, and a fixed threaded portion 42 protruding from the upper surface of the upper shaft portion 41. The upper shaft portion 41 of the connecting shaft 23 is press-fitted into a central bracket 48 in a state where the intermediate shaft 39 of the connecting shaft 23 is press-fitted into the central hole 38 of the strain member 20. So configured, the connecting shaft 23 is firmly attached to the strain member 20 at its base portion with the strain member 20 interposed between the flange 40 of the connecting shaft 23 and the central bracket 48.

In the meantime, as illustrated in FIG. 2, one of the pair of fixed shafts 19 protruding vertically upwardly at each end of the upper rail 16 is fitted into the attachment hole 33 of the first lower bracket 21 and the other one thereof is fitted into the attachment hole 37 of the second lower bracket 22. The bottoms of the base portions 29, 34 of the first and second lower brackets 21, 22 are seated on the fixing surface 18. Nuts 60 are tightened to the threaded tip ends of the respective fixed shafts 19. The nuts 60 apply force vertically downwardly to fixed portions 43, 44 of the upper bracket 24. Therefore, the strain member 20 of each occupant load sensor 10 is secured, at its both ends, to the fixing surface 18 of the upper rail 16 with a predetermined distance from the fixing surface 18.

The tip end of the connecting shaft 23 of each occupant load sensor 10 is physically associated with the seat 11 as follows. The frame 17 for the seat 11 is provided with at least one connecting surface 62 at which a connecting through-hole 63 is defined. A fixed threaded portion 42 of the connecting shaft 23 is fitted into the connecting through-hole 63 in a manner that the bottom of the connecting surface 62 comes in contact with the upper surface of the central bracket 48. Accordingly, the frame 17 is firmly mounted on the upper rails 16 via the strain members 20. Nuts 65 are tightened to the fixed threaded portions 42 of the connecting shafts 23. The nuts 65 apply force vertically downwardly to the connecting surfaces 62 in a manner that the connecting surfaces 62 are pressed with the central brackets 48. Therefore, the connecting shafts 23 of the occupant load sensors 10 are securely tightened to the frame 17 of the seat 11.

When the load of the occupant seated on the seat 11 is applied to the strain member 20 via the connecting shaft 23, the strain member 20 is flexibly bent while being supported at both ends by the first and second lower brackets 21, 22. Therefore, at each area between the connecting shaft 23 and each first and second lower bracket 21, 22 on the surface of the strain member 20, compressive strain are generated at the sides of the first and second brackets 21, 22, and tensile strain are generated at the sides of the connecting shaft 23. Degrees of the compressive strain and the tensile strain are in proportion to the load of the occupant applied to the strain member 20. In order to detect the compressive strain and the tensile strain, the strain gauges G1, G2 are respectively attached to the areas between the central portion of the strain member 20 and both ends of the strain member 20, i.e., to the areas between the connecting shaft 23 and the first and second lower brackets 21, 22. Each strain gauge G1, G2 incorporates therein two elements configuring half-bridges, and a full-bridge is configured with each half-bridge of the strain gauges G1, G2. Accordingly, strain or deflection of the strain member 20 is measured as a load of an occupant seated on the seat 11.

As illustrated in FIG. 4, each upper bracket 24, for example made of a steel plate, is assembled on the upper surface of the strain member 20 at the both ends of the strain member 20. The upper bracket 24 is provided with the fixed portions 43, 44 at both ends, at which fixed through-holes 45, 46 are formed respectively. The upper shaft 32 of the first lower bracket 21 is press-fitted into the fixed through-hole 45. The shaft portion 36 is press-fitted into the fixed through-hole 46. The strain member 20 is hence supportively interposed at its both ends between the fixed portions 43, 44 of the upper bracket 24 and the base portions 29, 34 of the lower brackets 21, 22. As illustrated in FIG. 5, a fixed surface 43a of the fixed portion 43 and a fixed surface 44a of the fixed portion 44 come in contact with the strain member 20.

The upper bracket 24 is formed with the attachment portion 47 connecting the fixed portions 43 and 44. As illustrated in FIG. 6, the attachment portion 47 extends beside the stain member 20, i.e., in a lateral direction from the strain member 20. As described above, because the strain member 20 overlaps the fixed portions 43, 44 of the upper bracket 24 but does not overlap the attachment portion 47 of the upper bracket 24, the upper bracket 24 does not influence the flexible deformation of the strain member 20. Therefore, it is possible to measure precisely the load (weight) of the occupant.

The attachment portion 47 of the upper bracket 24 is firmly fixed with the amplifier case 27, which is made of for example PBT (polybutylene terephthalate) resin, by a screw. In this case, the amplifier case 27 is arranged beside the strain member 20 in parallel thereto. As illustrated in FIG. 5, a case attachment surface 47a of the attachment portion 47 comes in contact with the amplifier case 27. The PBT resin for the amplifier case 27 is a more lightweight and economical material than aluminum used for a conventional case, thereby leading to a weight and cost saving amplifier case. A patterned amplifying circuit (not illustrated) is formed on the upper surface of the amplifier substrate 26. As illustrated in FIG. 3, a copper-foil ground pattern 45 is etched so as to cover the back surface of the patterned amplifying circuit. The FPC substrate 28, which is described later and is arranged at the upper surface side of the amplifier substrate 26, is provided with four terminals 46a, 46b, 46c and 46d which all protrude vertically downwardly. The terminal 46a (the left one in FIG. 3) is connected to the ground pattern 45. The amplifier case 27 is provided with a connector 59 that establishes a communication line for transmitting an output of the amplifier substrate 26 to a non-illustrated electronic control unit.

As illustrated in FIG. 4, the FPC substrate 28 shaped into a C shaped is connected to the strain gauge G1 at its leg between one end, and the center, of the strain member 20 and is further connected to the strain gauge G2 at its another leg between the other end, and the center, of the strain member 20. The FPC substrate 28 is formed with four through holes connected to a wiring pattern of the FPC substrate 28. The through holes are connected to the four terminals 46a, 46b, 46c and 46d (see FIG. 5) of the amplifier substrate 26, respectively. A connecting portion 53 of the leg of the FPC substrate 28 and the strain gauge G1 and the other connecting portion 54 are protected by coatings 55 with a hot-melted polyester resin for example.

According to the occupant load sensor 10 having a noise shielding structure described above, when an occupant is seated on the seat 11, the frame 17 secured to a seat cushion is applied with a load of the occupant. Each strain member 20 is applied with load via the corresponding connecting shaft 23 of the occupant load sensor 10. At each area between the connecting shaft 23 and each first and second lower bracket 21, 22 on the surface of the strain member 20, compressive strain are generated at the sides of the first and second brackets 21, 22 and tensile strain are generated at the sides of the connecting shaft 23. The strain is detected by the strain gauge G1, G2 as variations in electrical resistance and is converted into voltage. The output voltage is so weak that the amplifying circuit of the amplifier substrate 26 amplifies the output voltage. The output voltage amplified by the amplifying circuit is converted into a digital signal by an A/D converting circuit of the amplifier substrate 26, which digital signal is transmitted to an outside by a transmitting circuit of the amplifier substrate 26. As described above, a load of an occupant seated on the seat 11 is obtained as an output of the digital signal of the amplifier substrate 26.

As described above, in the occupant load sensor 10 having the noise shielding structure, the amplifier case 27 is arranged to be laterally distant from the upper rail 16 and the frame 17. Therefore, it is possible to minimize the distance between the strain gauges G1, G2 of each strain member 20 and the corresponding amplifier substrate 26 housed in the amplifier case 27. It is further possible to reduce a vertical distance between the upper rails 16 and the frame 17, thereby saving a space.

So configured, both surfaces of the amplifier substrate 26 are shifted laterally from the upper rails (floor-side stationary member) 16 and the frame (seat-side stationary member) 17, which both are made of metal having a shielding effect. The upper bracket 24, which is employed to fix the amplifier case 27 beside or at a lateral side of the upper rail 16 and the frame 17 and is made of metal, covers the upper surface of the amplifier substrate 26. Moreover, the bottom surface of the amplifier substrate 26 is covered by the ground pattern 45 of the amplifier substrate 26. Accordingly, noise can be shielded at both upper and bottom surfaces of the amplifier substrate 26. As described above, because of covering both surfaces of the amplifier substrate 26 by metal having a highly shielding performance, noise is effectively shielded and components exclusive for noise-shielding, such as a metal case, is not needed, thereby reducing the number of components and the manufacturing cost.

Further, the strain member 20 and the case attachment surface 47a are arranged in parallel to each other in a manner that the strain member 20 is arranged vertically on the fixed surfaces 43a, 44a at one side of the upper bracket 24, and the amplifier case 27 is arranged vertically on the case attachment surface 47a. In this case, it is possible to shorten the distance between the strain gauges G1, G2 of the strain member 20 and the amplifier substrate 26 housed in the amplifier case 27. Therefore, signals detected by the strain gauges G1, G2 are prevented from being attenuated, and the signals are effectively prevented from being added with noise created until being transmitted to the amplifier substrate 26.

According to the embodiment, the upper surface of the amplifier substrate 26 is covered by the upper bracket 24 made of a steel plate, and the bottom surface thereof is covered by the copper-foil ground patter 45. However, the structure is not limited to the above, and an identical or similar bracket may cover the bottom surface that is a print-circuit board.

According to the embodiment, the upper bracket 24 is made of a steel plate. However, the structure is not limited to the above, and the upper bracket 24 may be made of an aluminum alloy for example.

Figure 7:
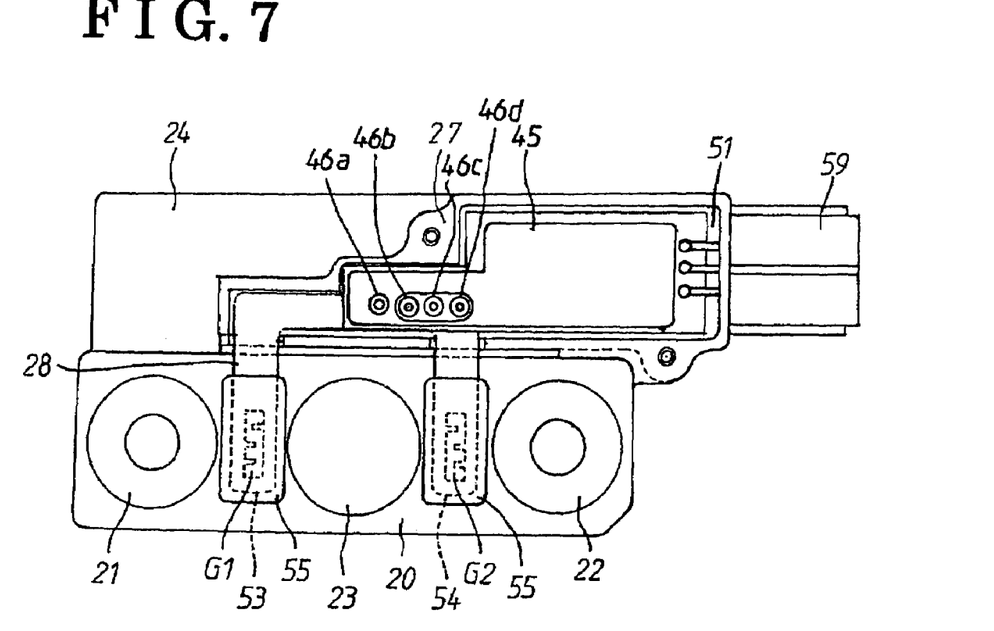
FIG. 7 is a view illustrating another example of a ground pattern.

According to the embodiment, the ground pattern 45 is a copper foil. However, the structure is not limited to the above, and a known conductive metal foil is applicable. The area covered by the ground pattern 45 is not limited to the illustration in FIG. 3. For example, as illustrated in FIG. 7, the ground pattern 45 can cover partially the amplifier substrate 26 or a terminal.

Figure 8:
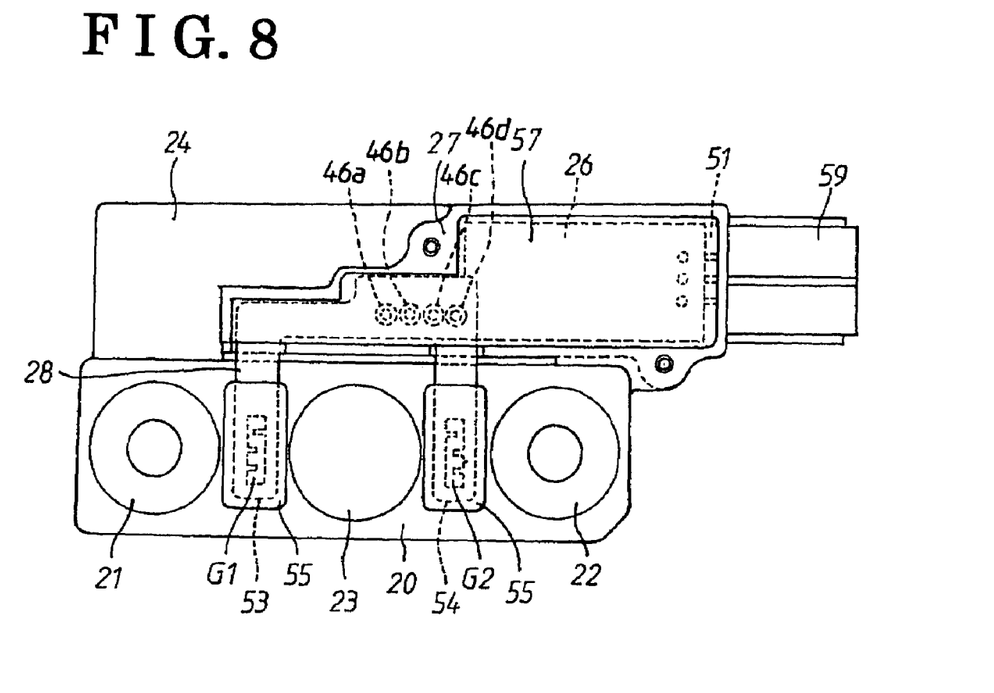
FIG. 8 is a view illustrating another example a protected back surface of an amplifier case.

As illustrated in FIG. 8, as for a substrate chamber 51 of the amplifier case 27, connecting portions between the back portion of the FPC substrate 28 and the respective terminals 46a, 46b, 46c and 46d of the amplifier substrate 26, and the amplifier substrate 26 can be, for example, hot-melted with polyester resin at a low pressure so as to be covered and protected by a low-pressure resin-molding 57.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An occupant load sensor of a seat for a vehicle, comprising:
    a strain member adapted to be fixed at both ends of a fixing surface provided at one of a floor-side stationary member and a seat-side stationary member with a predetermined distance from the fixing surface in a vertical direction of the seat;
    a connecting member vertically fixed to the strain member and adapted to be fixed to the other one of the floor-side stationary member and the seat-side stationary member,
    a strain gauge attached to the strain member;
    a metal-made bracket fixed to the strain member and having an attachment portion extending in a lateral direction of the seat from the strain member;
    an amplifier substrate for amplifying a signal transmitted by the strain gauge, one surface of the amplifier substrate being covered by the attachment portion of the metal-made bracket and the other surface thereof being covered by a metal-foil ground pattern; and
    a resin-made amplifier case fixed to the attachment portion of the metal-made bracket and arranged in parallel to the strain member, the resin-made amplifier case housing the amplifier substrate.

2. An occupant load sensor of a seat for a vehicle according to claim 1, wherein
    the metal-made bracket has a fixing surface which comes in contact with the strain member when the metal-made bracket is fixed to the strain member, and a case attachment surface which comes in contact with the resin-made amplifier case and arranged at the same side as the fixing surface.

* * * * *